(12) United States Patent
Jones et al.

(10) Patent No.: US 12,271,390 B2
(45) Date of Patent: Apr. 8, 2025

(54) ANALYSIS SYSTEM

(71) Applicant: Health Catalyst, Inc., South Jordan, UT (US)

(72) Inventors: Jason Jones, Tucson, AZ (US); Max Taggart, Salt Lake City, UT (US); Haider Syed, Sandy, UT (US); Michael Mastanduno, Holladay, UT (US); Jessica Curran, Oro Valley, AZ (US); Evan Sanders, Ivans, UT (US)

(73) Assignee: Health Catalysts Inc., South Jordan, UT (US)

( * ) Notice: Subject to any disclaimer, the term of this patent is extended or adjusted under 35 U.S.C. 154(b) by 0 days.

(21) Appl. No.: 18/181,053

(22) Filed: Mar. 9, 2023

(65) Prior Publication Data

US 2023/0289358 A1   Sep. 14, 2023

Related U.S. Application Data

(60) Provisional application No. 63/318,310, filed on Mar. 9, 2022.

(51) Int. Cl.
*G06F 16/248* (2019.01)
*G06F 16/2458* (2019.01)

(52) U.S. Cl.
CPC ........ *G06F 16/248* (2019.01); *G06F 16/2462* (2019.01)

(58) Field of Classification Search
None
See application file for complete search history.

(56) References Cited

U.S. PATENT DOCUMENTS

| | | | |
|---|---|---|---|
| 6,804,563 B1* | 10/2004 | Lafaye de Micheaux | G06Q 10/06 700/109 |
| 12,041,140 B2* | 7/2024 | Gaddam | H04L 67/306 |
| 2017/0024403 A1* | 1/2017 | Tocchini | G06F 40/186 |
| 2018/0088753 A1* | 3/2018 | Viégas | G06F 16/2282 |
| 2020/0210647 A1* | 7/2020 | Panuganty | G06N 3/08 |
| 2021/0350068 A1* | 11/2021 | Sanossian | G06F 16/258 |
| 2022/0164235 A1* | 5/2022 | Zuzga | G06F 9/5027 |

* cited by examiner

*Primary Examiner* — Dawaune A Conyers
(74) *Attorney, Agent, or Firm* — Patent Law Works LLP

(57) ABSTRACT

The disclosure includes a system and method are described for receiving, using one or more processors, a request to generate a report based on an identified data set; determining, using one or more processors, a first statistical approach to apply to the identified data set automatically; applying, using one or more processors, the first statistical approach to the identified data; generating, using one or more processors, a report including one or more charts based on at least one statistical approach; and presenting, using the one or more processors, the report.

18 Claims, 12 Drawing Sheets

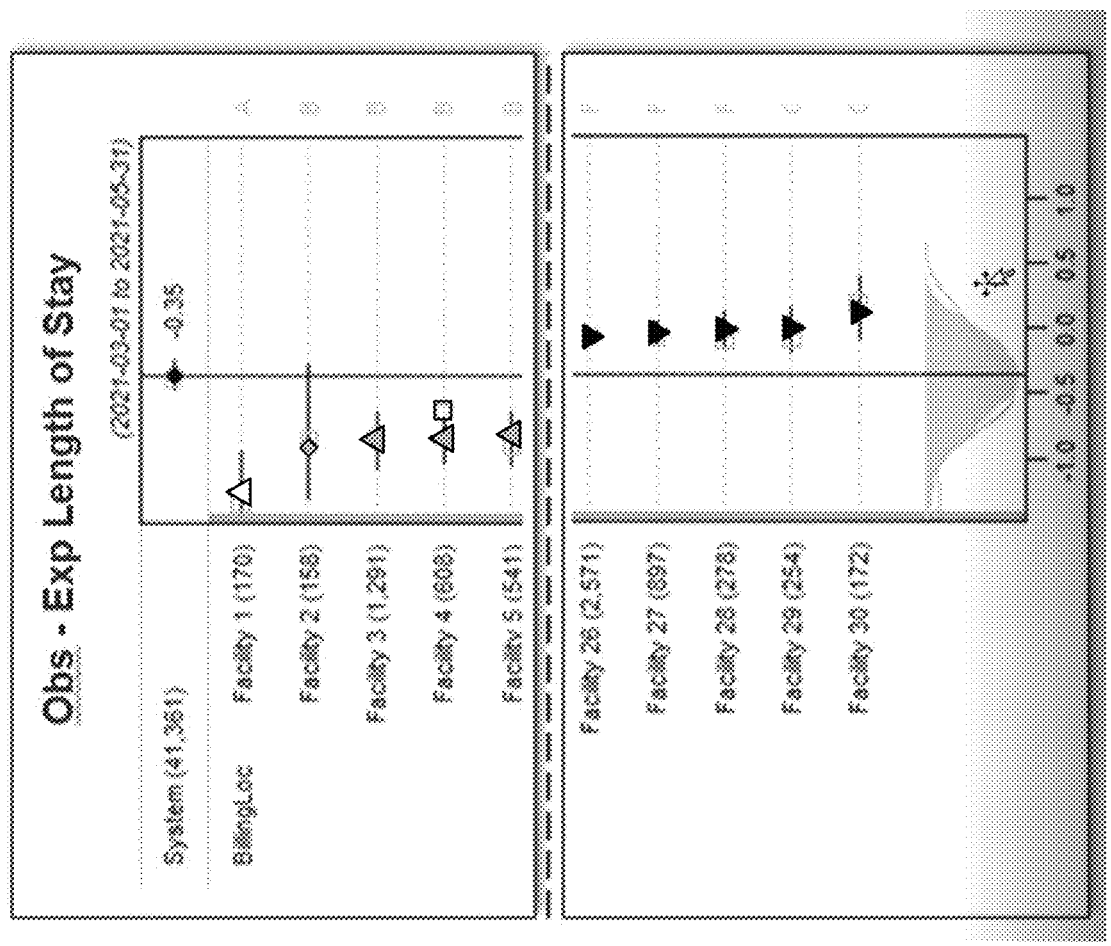

Forest Plot Generated by SPC Engine 126 and Features according some implementations.

- Top performers at top
- Colors and Letters indicate performance cluster
- Square indicates projected performance (forecast)
- Shapes indicate significantly different from system
- Density plot- gives a sense of distribution and type of strategy for improvement. Blue shaded portion is current distribution and grey line is forecast distribution.

Figure 8

ANALYSIS SYSTEM

CROSS-REFERENCE TO RELATED APPLICATIONS

This application claims priority, under 35 U.S.C. § 119, of U.S. Provisional Patent Application No. 63/318,310, filed Mar. 9, 2022, titled "Healthcare.AI," the entirety of which is hereby incorporated by reference.

BACKGROUND

Statistical process control and forecasting often involve representing data. However, representing the data so that it is useable and obtaining those representations in a timely manner is challenging for existing systems and even knowledgeable users.

SUMMARY

This specification relates to methods and systems for receiving, using one or more processors, a request to generate a report based on an identified data set; determining, using one or more processors, a first statistical approach to apply to the identified data set automatically; applying, using one or more processors, the first statistical approach to the identified data; generating, using one or more processors, a report including one or more charts based on at least one statistical approach; and presenting, using the one or more processors, the report.

Other implementations of one or more of these aspects include corresponding systems, apparatus, and computer programs, configured to perform the actions of the methods, encoded on computer storage devices.

These and other implementations may each optionally include one or more of the following features. For instance, the features include that the first statistical approach to apply to the identified data set is automatically determined by applying a machine learning model. For instance, the features include that the one or more charts include at least one of an X-MR chart, an I-MR char, an Xbar-R chart, an Xbar-S chart, C-chart, a u-chart, an np chart, a p-chart, a s-chart, an r-chart, an mr-chart, and a forest plot.

For instance, the features include: determining whether the first statistical approach results in a suitable chart; and responsive to the first statistical approach resulting in a suitable chart, including the suitable chart in the report; or responsive to the first statistical approach resulting in an unsuitable chart, applying a second statistical approach. For instance, the features include that one or more of the first statistical approach and the second statistical approach is in contravention of statistical process norms. For instance, the features include that one or more of the first statistical approach and the second statistical approach is in contravention of statistical process norms but is determined to yield a suitable result, wherein suitability is based on one or more of a number and a proportion of outliers identified.

For instance, the features include determining the first statistical approach to apply to the identified data set automatically is responsive to selection of a first graphical element; and presenting a user interface to a user on a display, wherein the user interface includes: the first graphical element that allows a user to selectively activate and deactivate the automatic determination of the first statistical approach; a second graphical element that determines, based on user input selecting from a plurality of available chart types, a chart type and at least partially overrides the automatic determination of the first statistical approach; a third graphical element that determines, based on user input, a change point method and at least partially overrides the automatic determination of the first statistical approach; a fourth graphical element that determines, based on user input, a confidence method and at least partially overrides the automatic determination of the first statistical approach; a fifth graphical element that determines, based on user input, whether a forecast is presented and at least partially overrides the automatic determination of the first statistical approach; and a plurality of graphical elements associated with a plurality of user selectable visualizations for user-selectable inclusion in the report.

For instance, the features include determining whether the request to generate the report is a bursty request or a resource intensive request; and responsive to determining that the request to generate the report is bursty, assigning the request to generate the report to a first computational resource; or responsive to determining that the request to generate the report is resource intensive, assigning the request to generate the report to a second computational resource. For instance, the features include that the first computational resource and the second computational resource differ in one or more of scaling rules, processing core size, and memory core size. For instance, the features include determining whether the request to generate the report is a bursty request or a resource intensive request is based on a machine learning model trained using historical request data including response time.

BRIEF DESCRIPTION OF THE DRAWINGS

The disclosure is illustrated by way of example, and not by way of limitation in the figures of the accompanying drawings in which like reference numerals are used to refer to similar elements.

FIG. 8 illustrates an example forest plot and associated features in accordance with some implementations.

DETAILED DESCRIPTION

The present disclosure relates to performing analysis, leveraging the analysis, and generating outputs. For clarity and convenience, the present disclosure is described in the context of statistical process control, forecasting, and generating reports related to statistical process control and forecasting. However, it should be understood that these are examples selected for clarity and convenience, and other analysis and generated outputs are within the scope of this disclosure.

Figure 1:
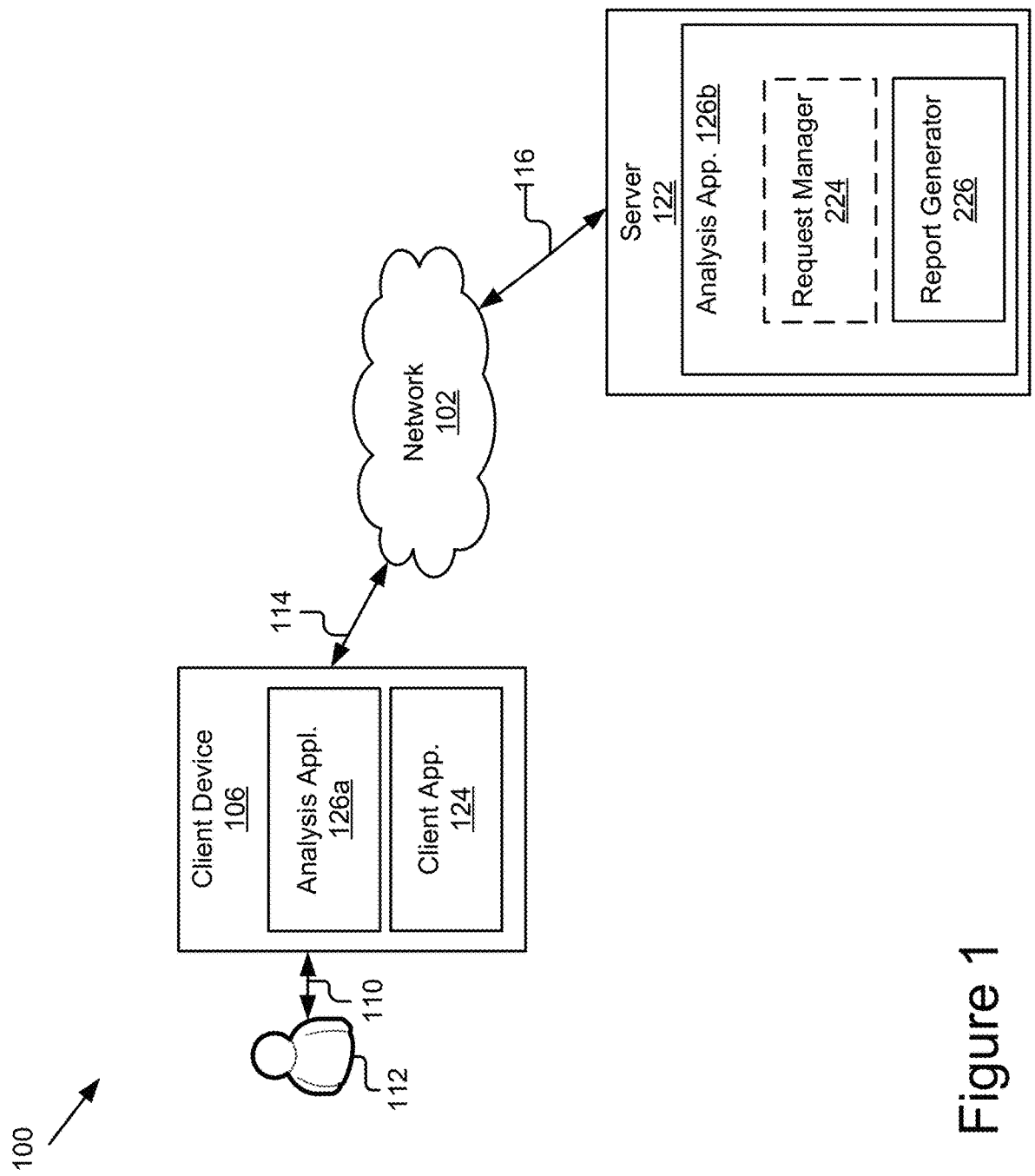
FIG. 1 is a block diagram of one example implementation of a system for analysis in accordance with some implementations.

FIG. 1 is a block diagram of an example system 100 for analysis in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122, data warehouses (not shown), network accessible storage (not shown), etc.). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. For example, the server 122 may include one or more hardware servers, server arrays, storage devices, systems, etc., and/or may be centralized or distributed/cloud-based. In some implementations, the server 122 may send and receive data to and from other entities of the system 100 (e.g., one or more client devices 106). In some implementations, the server 122 may include one or more virtual servers, which operate in a host server environment and access the physical hardware of the host server including, for example, a processor, memory, storage, network interfaces, etc., via an abstraction layer (e.g., a virtual machine manager). The server 122 may be communicatively coupled to the network 102, as indicated by signal line 116.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may include analysis application 126*a* (e.g., as a plugin, widget, or add-on to a third-party client application 124) and the server 122 may include the analysis application 126*b*. However, in some implementations, the components and functionality of the analysis application 126 may be entirely client-side (i.e., at 226*a*), entirely server side (i.e., at 226*b*), or divide among the client device 106 and server 122 (i.e., divided across 226*a* and 226*b*). Additionally, in some implementations, the features and functionality of the analysis application 126 may be included in the client application 124. For clarity and convenience, the description herein may refer to an example implementation where the client application 124 is business intelligence (BI) tool, such as Microsoft Power BI Visuals, Tableau, Qlik Sense, or other BI tool; however, other client applications 124 are within the scope of this disclosure.

As another example, in some implementations, the illustrated server 122 may, in some implementations, include multiple hardware and/or virtual machines (not shown) and the functionality of the analysis application 126*b* may be distributed. In one such implementation, multiple instances of the report generator 226 (not shown) may be present, and the optional in some implementations (as indicated by the dashed line) request manager 224 may determine which requests, charts, or reports are "bursty" and assign the associated chart and/or report generation to a first subset of machines and/or report generator 226 instances, and determine which requests, charts, or reports are resource intensive and assign the associated chart and/or report generation to a second subset of machines and/or report generator 226 instances. Depending on the implementation, the subsets or machines and/or report generators 226 instances may or may not be identical. For example, in some implementations, the core size of the second subset of machines may be assigned/provisioned as larger. As another example, in some implementations, a first subset of report generators 226 may not be enabled to generate a resource-intensive chart type or report type and/or the second subset of report generators 226 may not be enabled to generate a bursty chart type or report type.

The report generator 226 provides the features and functionalities described below. In some implementations, the computer device 200 is a server 122 and includes the report generator 226.

The request manager 224 provides the features and functionalities described below. In some implementations, the computer device 200 is a server 122 and optionally includes the request manager 224.

Figure 2:
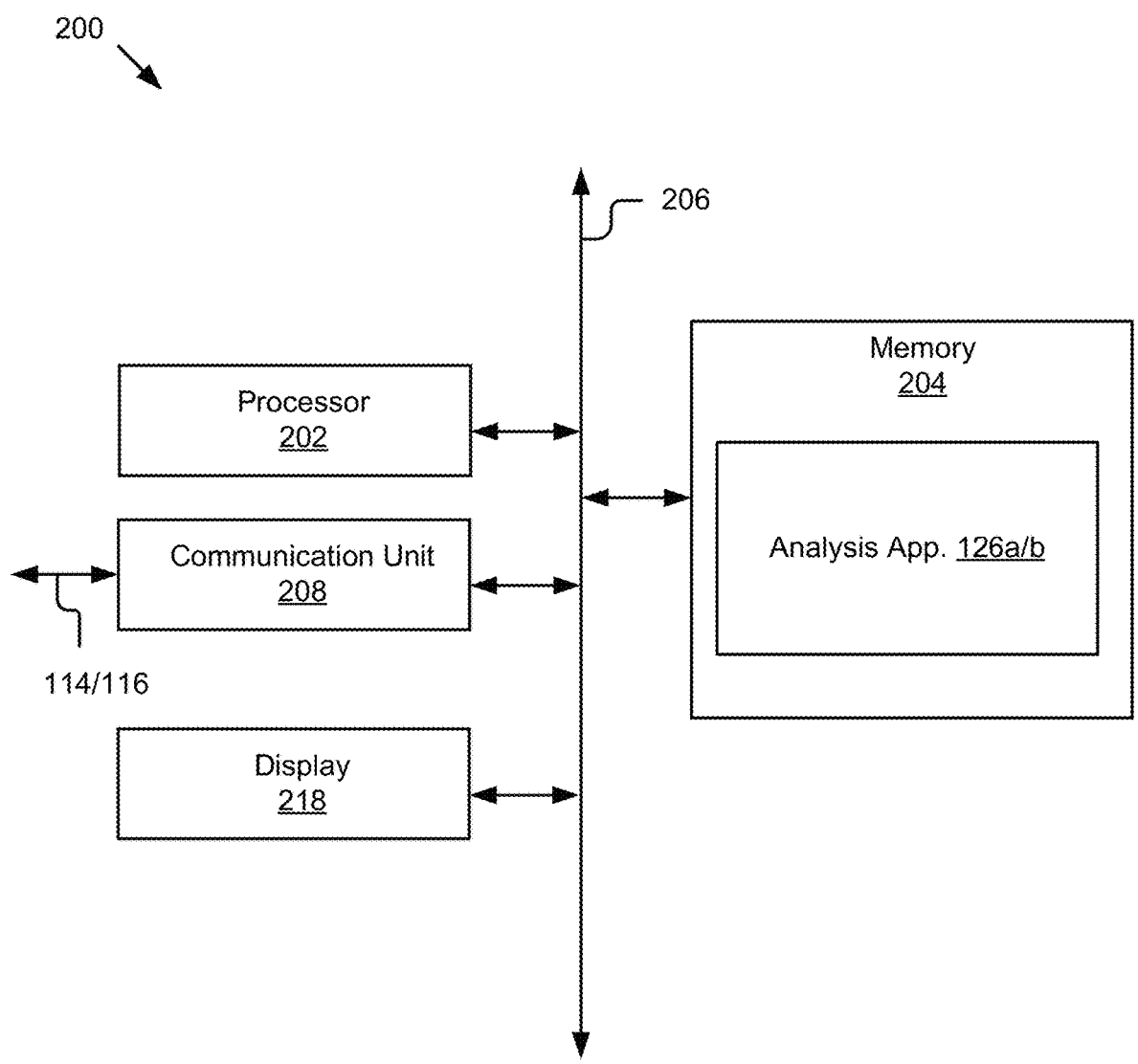
FIG. 2 is a block diagram of an example computing device in accordance with some implementations.

FIG. 2 is a block diagram of an example computing device 200 including an instance of the analysis application 126*a/b*. In the illustrated example, the computing device 200 includes a processor 202, a memory 204, a communication unit 208, and a display 218. In some implementations, the computing device 200 is a client device 106, the memory 204 stores analysis application 126*a*, and the communication unit 208 is communicatively coupled to the network 102 via signal line 114. In another implementation, the computing device 200 is a server 122, the memory 204 stores the analysis application 126b, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the analysis application 126a/b. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 is a conventional type such as a liquid crystal display (LCD), light emitting diode (LED), touch-screen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

Figure 3:
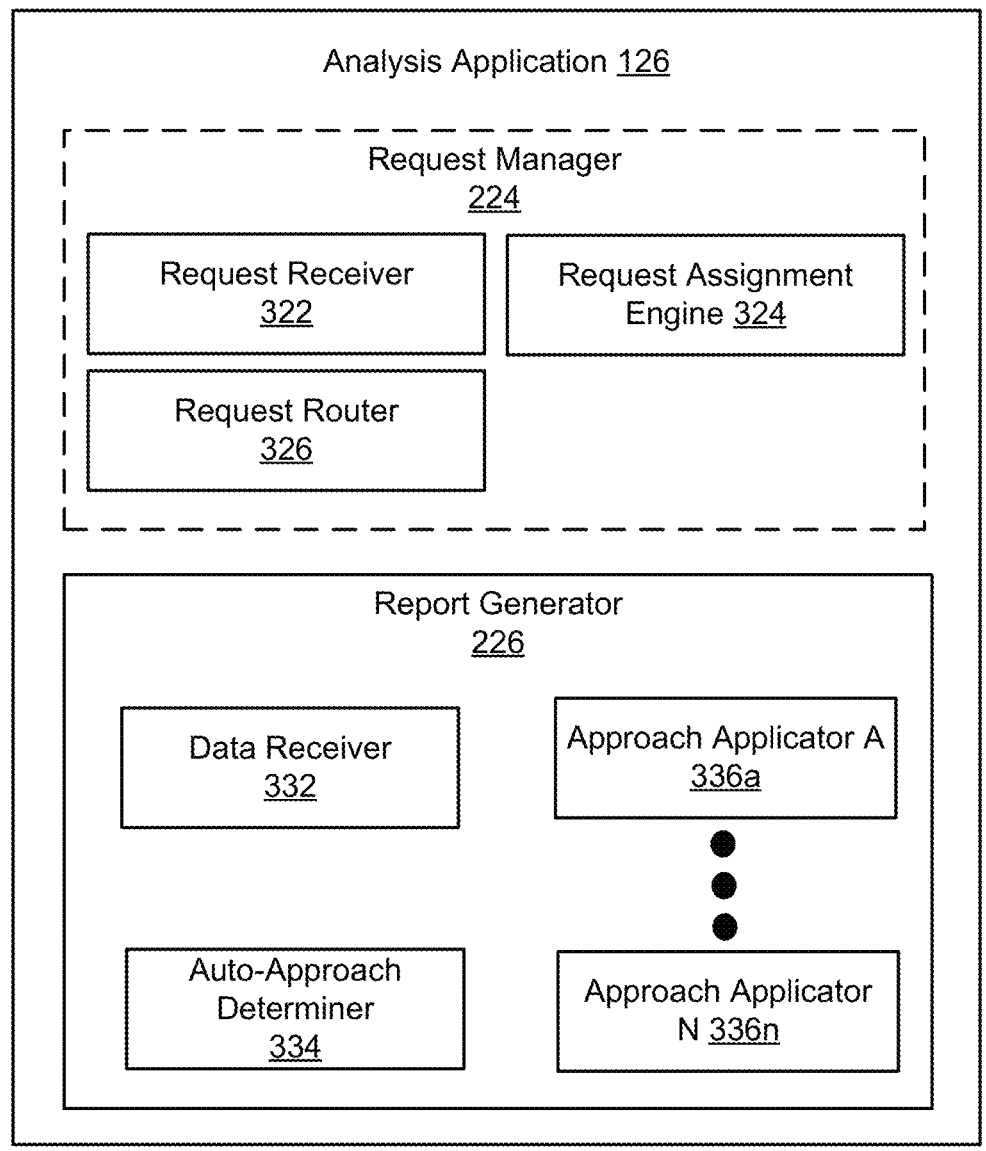
FIG. 3 is a block diagram of an example analysis application in accordance with some implementations.

Referring now to FIG. 3, a block diagram of an example analysis application 126 is illustrated in accordance with one implementation. As illustrated in FIG. 3, the analysis application 126 may include a request manager 224 and a report generator 226. In some implementations, the request manager 224 may be optional and omitted.

It should be recognized that, depending on the implementation, the report generator 226 may receive requests for and respond with a wide variety of different reports. It should further be recognized that some requested reports may be more resource intensive (e.g., requiring more computational resources) and some requested reports may be received in bursts (e.g., at the close of business; end of the day, week, month, quarter, or year, whether calendar or fiscal, etc.). In some implementations, the request manager 224 may beneficially manage requests and how, or by which report generator 226, the request is serviced.

In some implementations, the request manager 224 includes a request receiver 322, a request assignment engine 324, and a request router 326, as illustrated in FIG. 3. In some implementations the request receiver 322, the request assignment engine 324, and the request router 326 are communicatively coupled to one another and/or other components, or subcomponents, of the analysis application 126, e.g., to exchange data and information.

The request receiver 322 receives requests, e.g., from users 112, for charts and/or reports. In some implementations, the request receiver 322 is communicatively coupled to pass the request to the assignment engine 324. In some implementations, the request receiver 322 is communicatively coupled to pass information about the received request, in addition to or instead of the request itself, to the request assignment engine 324. Examples of information about the received request may include, but are not limited to, data describing one or more of a time of the request, a source of the request (e.g., device identifier such as MAC address, user identifier such as user name, network address such as IP address, etc.), the request (e.g., chart type or report requested), the data set (e.g., location of data to be analyzed, size of data set, type of data set and/or schema), etc.

The request assignment engine 324 receives one or more of the request and the information describing the request. Depending on the implementation, the request assignment engine 324 may use one or more mechanisms for assigning a given request. For example, depending on the implementation, the request assignment engine 324 may use one or more of a rule set (e.g., human coded and/or machine learning derived rules), heuristics, and machine learning to assign a request. In some implementations, the request assignment engine 324 uses a combination of rules and machine learning.

In some implementations, the request assignment engine 324 uses machine learning and receives one or more of the requests and information associated with requests (e.g., meta data, response times for requests, time stamps of requests, etc.) as training data, and uses that data for training and validation of a machine learning model. During deployment/runtime (after training and validation of the model), the request assignment engine 324 may identify (e.g., classify) requests. For example, in some implementations, a request may be classified as "bursty" or "resource intensive." In some implementations, the identifications may be used to divide report generation functionality responsive to the identified requests. For example, in some implementations, the system 100 may include multiple instances of the report generator 226 (not shown), e.g., implemented on different virtual machines, and a first subsets of those instances may be dedicated or specialized (e.g., with regard to one or more of scaling rules, core size, etc.) to respond to bursty requests, and a second subset may be dedicated or specialized (e.g., with regard to one or more of scaling rules, core size—CPU and/or memory, etc.) to respond to resource intensive report generation requests, and the request assignment engine 324, during runtime, may communicate with the request router 326 to route the request to a report generator 226 in the subset of instances associated with the type of request (e.g., bursty or resource intensive) identified by the request assignment engine 324.

The varieties of supervised, semi-supervised, and unsupervised machine learning algorithms that may be used, by the request ML engine 324, to train a machine learning model are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, the machine learning model, in some implementations, may be based on an ensemble of multiple machine learning algorithms, which may or may not be based on a common algorithm (e.g., gradient boosted tree) or a common type of machine learning algorithm (e.g., supervised).

In some implementations, the report generator 226 generates a report responsive to a request. In some implementations, the report generator 226 receives the request, analyzes data associated with the request, and automatically determines the report generated (e.g., one or more of the charts, chart types, and statistical approaches applied to generate a chart, etc.). In some implementations, the "automatic" generations use one or more of a rule set and a machine learning and/or AI model. In some implementations, the auto-generated report may be modified or overridden by the user (e.g., the user may change one or more of a chart type, statistical approach used, etc.). In some implementations, the report generator 226 may use those modifications as training data and retrain (e.g., batch, mini-batch, or online retrain) the AI an/or ML model to improve future accuracy and/or efficiency, e.g., based on user modifications/overrides and/or to minimize future user modifications/overrides.

Depending on the implementation, one or more of (1) which request(s) are defined as bursty or resource intensive and (2) the computational resource(s) assigned to service each type of request may be determined based on the machine learning. For example, a first machine learning algorithm may be trained to optimize and assign scaling rules and core sizes for a first set of resources to respond to bursty requests, a second machine learning algorithm may be trained to optimize and assign scaling rules and core sizes for a second set of resources to respond to resource intensive requests, and a third machine learning algorithm may be trained to determine (e.g., classify) whether an incoming request is burty or resource intensive so that it may be routed to the proper computational resource to be serviced.

In some implementations, the report generator 226 includes a data receiver 332, an auto-approach determiner 334, and one or more approach applicators 336, as illustrated in FIG. 3, by approach applicator A 336a and approach applicator N 336n. In some implementations the data receiver 332, the auto-approach determiner 334, and the one or more approach applicators 336 are communicatively coupled to one another and/or other components, or subcomponents, of the analysis application 126, e.g., to exchange data and information.

The data receiver 332 obtains the data associated with the request (e.g., by interfacing with a BI tool, or other client application 124, which maintains the data).

The auto-approach determiner 334 automatically determines the statistical approach(es) used and the report or a portion thereof (e.g., a chart) generated, applies the approach (es) and, generates the report, which is returned responsive to a request.

Depending on the implementation, the auto-approach determiner 334 may use heuristics (rules), machine learning, or a combination thereof. The varieties of supervised, semi-supervised, and unsupervised machine learning algorithms that may be used, by the auto-approach determiner 334, to train a machine learning model applied by the auto-approach determiner 334 are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, the machine learning model applied by the auto-approach determiner 334, in some implementations, may be based on an ensemble of multiple machine learning algorithms, which may or may not be based on a common algorithm (e.g., gradient boosted tree) or a common type of machine learning algorithm (e.g., supervised).

The number and types of approach applicators 336 may vary depending on the use case and implementation. Examples of an approach applicators 336 may include a chart applicator (e.g., to generate a c-chart, u-chart, i-chart, np-chart, p-chart, s-chart, r-chart, mr-chart, forest chart, etc.), a method applicator (e.g., a bootstrapping applicator, etc.), or a forecaster (e.g., to generate a forecast).

In some implementations, the auto-approach determiner 334 automatically determines which approach applicators 136 to apply responsive to the request and cause the determined approach applicator(s) 136 to execute and thereby generate charts and/or a report.

In some implementations, the auto-approach determiner 334 may evaluate an output of the approach applicator(s) 136 prior to responding to the request. For example, the auto-approach determiner may evaluate whether the output is unsuitable (e.g., as defined by the machine learning model and/or rules). In some implementations, responsive to determining that the output is unsuitable, the auto-approach determiner 334 may trigger a different subset of approach applicators 136 to execute and evaluate the subsequently generated output for suitability. The process of generation, evaluation, and triggering a subsequent generation may be repeated until the appropriate, or available, approach applicators are exhausted or the output is determined to be suitable (e.g., as defined by the machine learning model and/or rules).

In some implementations, responsive to determining that the output is suitable, the output is presented (e.g., as a chart or report) to the user. Suitability is contextual, and the auto-approach determiner 334 learns what is suitable based on the context, e.g., based on the data (e.g., amount of data, type of data), features of the data (e.g., continuous or discreet), the approach applied, the use case, and the output (e.g., whether too many/too high of a proportion of points are identified as outliers to be useful and actionable), under what circumstances, or to avoid circumstances where, user(s) historically modified/overrode an approach, thereby altering the final chart and/or report.

For clarity and convenience, some of the features and functionalities of the analysis application 126 and potential benefits are described below. To aid in understand, some examples are illustrated and described; however, it should be recognized that these are merely examples provided for clarity and convenience, and other examples and potential benefits are contemplated and within the scope of this description.

One problem in the statistical process control space is obtaining multiple requests for reports in a short period of time. A first potential benefit of the features and functionalities described herein is a reduced response time and more efficient allocation of computing resources. For example, when a system takes too long to generate a response (e.g., a set of charts, which may require intensive statistical calculations), users may terminate the request or leave; however, the systems and methods herein may respond to even complex requests quickly, e.g., within 7 seconds. In some implementations, the systems and methods described herein my service a variety of requests, or types of requests, and produce a variety of different reports (which may include one or more charts of one or more types) in response. However, those requests and reports are not necessarily homogenous and/or do not come at predictable times. For example, some reports, or types of reports, may be more computationally intensive than others, e.g., depending on the type and number of charts requested and/or the size of the data set to be represented. As another example, some requests, or types of requests, may occur in bursts, which may be characterized by an unpredictable or sporadic receipt of requests and/or a high volume of requests over a short period of time. As described herein, in some implementations, the request manager 224 may beneficially manage requests to better balance "bursty" requests and resource intensive requests to better allocate, or scale, computational resources for response. In some implementations, this may result in a shorter response time for the requesting party and/or a lower cumulative use of computational resources. It should also be recognized that the responsiveness and shorter response times may be provided by the system 100 and methods described herein without control over the client application 124 used by the user 112, which may be third-party client applications.

A second problem encountered in the statistical process control space is that the visualization may be requested by any number of client applications 124. The client applications 124 may include one or more different BI tools and/or a database, direct code call, or another application, e.g., that is capable of calling an API associated with the analysis application 126 or otherwise interacting with the analysis application 126. Referring to an implementation using multiple different BI tools, providing a common set of functionalities across the heterogenous BI tools can be burdensome, particularly as the common set of functionality increases in size, as there are more potential points of failure. A second potential benefit of the features and functionality described herein may include a cross-platform, or platform agnostic, architecture, which provides easier and more rapid integration with third-party products including business intelligence (BI) tools, which may decrease disruptions to the functionality of the analysis application 122 due to third-party updates, and quicker roll out of functionality across a variety of supported BI tools.

Figure 4:
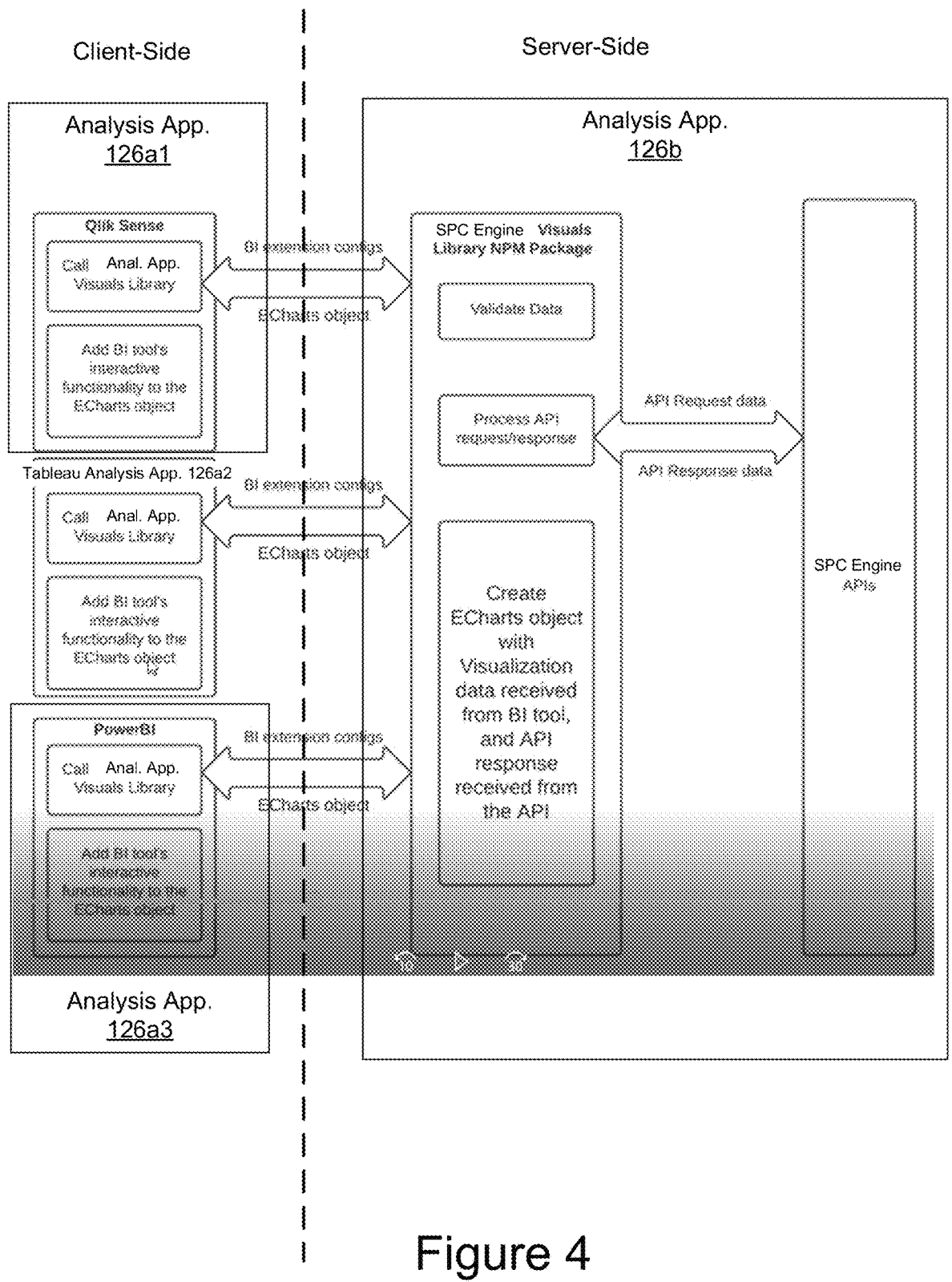
FIG. 4 is a block diagram of an example analysis application architecture in accordance with some implementations.

For example, referring now to FIG. 4, an example implementation is illustrated in which client-side instances of the analysis application 126a are illustrated for three BI tools—Qlik Sense 126a1, Tableau 126a2, and Power BI 126a3. However, it should be recognized that these BI tools, i.e., Qlik sense, Tableau, and Power BI, are merely examples and additional, fewer, or different BI tools may be used and supported without departing from the description herein. In the illustrated implementation, the client-side analysis applications 126a make calls to the server-side analysis application's 126b visual library and add interactive functionality, tailored to the associated BI tool, to objects (e.g., chart(s) and/or report(s)) generated by the server-side analysis application 126b. It should be recognized that implementations with architecture such as that depicted in FIG. 4, may enable (1) rapid support for BI tools with little effort (e.g. by creating a new client-side instance with the interactive functionality to interact with an Echart object tailored to that BI tool); (2) simplify support of individual BI tool integration making the system more robust and bug-free (e.g. the client-side portion tailored to that BI tool is a relatively small amount of code to troubleshoot and fix if something goes wrong, for example, due to the BI tool issuing an update); 3 allows for more rapid and seamless launching of features and functionalities.

A third problem encountered by a user in the statistical process control space is that the user may not know which tools to use (e.g., there may be one tool for a p-chart, one for a c-chart, one for a u-chart). This may allow easier trouble shooting by the publisher when the BI tool is updated. However, it is less than ideal for the user for a number of reasons. For example, seeking out and downloading individual widgets/add-ins/plug-ins is disruptive to the user's flow particularly when the user does not know what widgets/add-ins/plug-ins are appropriate for the user's use case. A third potential benefit of the features and functionality described herein may include a variety of one or more of the statistical methods, charts, and reports provided by the analysis application 126 described herein, e.g., rather than the a la carte strategy of providing individual widgets/add-ins/plug-ins. A fourth potential benefit of the features and functionalities described herein is that they enable a less-knowledgeable user to produce a useable report. For example, existing solutions for statistical process control, require a user with a high-level of familiarity with statistics, the data, and various reports to know which individual tool to obtain and apply in order to generate useable charts and reports. For example, the user must be able to understand whether the data is continuous or discreet, what the difference is between, e.g., a p-chart and a c-chart, the uses and limitations of both, whether and/or how any limitations with a particular chart/approach may be mitigated, etc. Additionally, even knowledgeable users have a particular knowledge area, e.g., knowledgeable users may be knowledgeable in statistical process control (SPC) or forecast, but seldom both. The analysis application 126 described herein may guide and/or produce a useable chart for a less-knowledgeable user and/or across disparate knowledge areas, e.g., using AI and/or machine learning to apply forecasting to SPC in some implementations.

A fourth problem encountered in the statistical process control space is that the situations encountered may varied and require different skill sets for analysis. A fifth potential benefit of the features and functionalities described herein is that the analysis application 126 may produce more complex and useable reports than existing solutions may allow even a knowledgeable user to generate. For example, statistics is a wide topic and analysts (i.e., users) may often have a specialization or familiarity with a subset of statistics. Therefore, it may be unrealistic to expect a human analyst to be able to be familiar with the various charts (e.g., I-chart, p-chart, u-chart, t-chart, etc.), bootstrapping, changepoint detection, and forecasting, and know which to use, how to use it, and when to user it, while the analysis application 126 may do so.

A fifth problem encountered in the statistical process control space is that strict adherence to conventions taught to analysts may not result in usable insights. A sixth potential benefit of the features and functionalities described herein may include the machine-generation of usable charts and reports, where a human analyst would not have thought to create such a chart or report, e.g., due to conventional statistical practices and teachings and the creation of such a chart or report being in contravention to those practices. In some implementations, the machine-generated approach is the default approach applied by the analysis application 126. In some implementations, the auto-determined/machine-generated approach may be overridden by a user, e.g., based on knowledge the user has that the machine does not.

Figure 5:
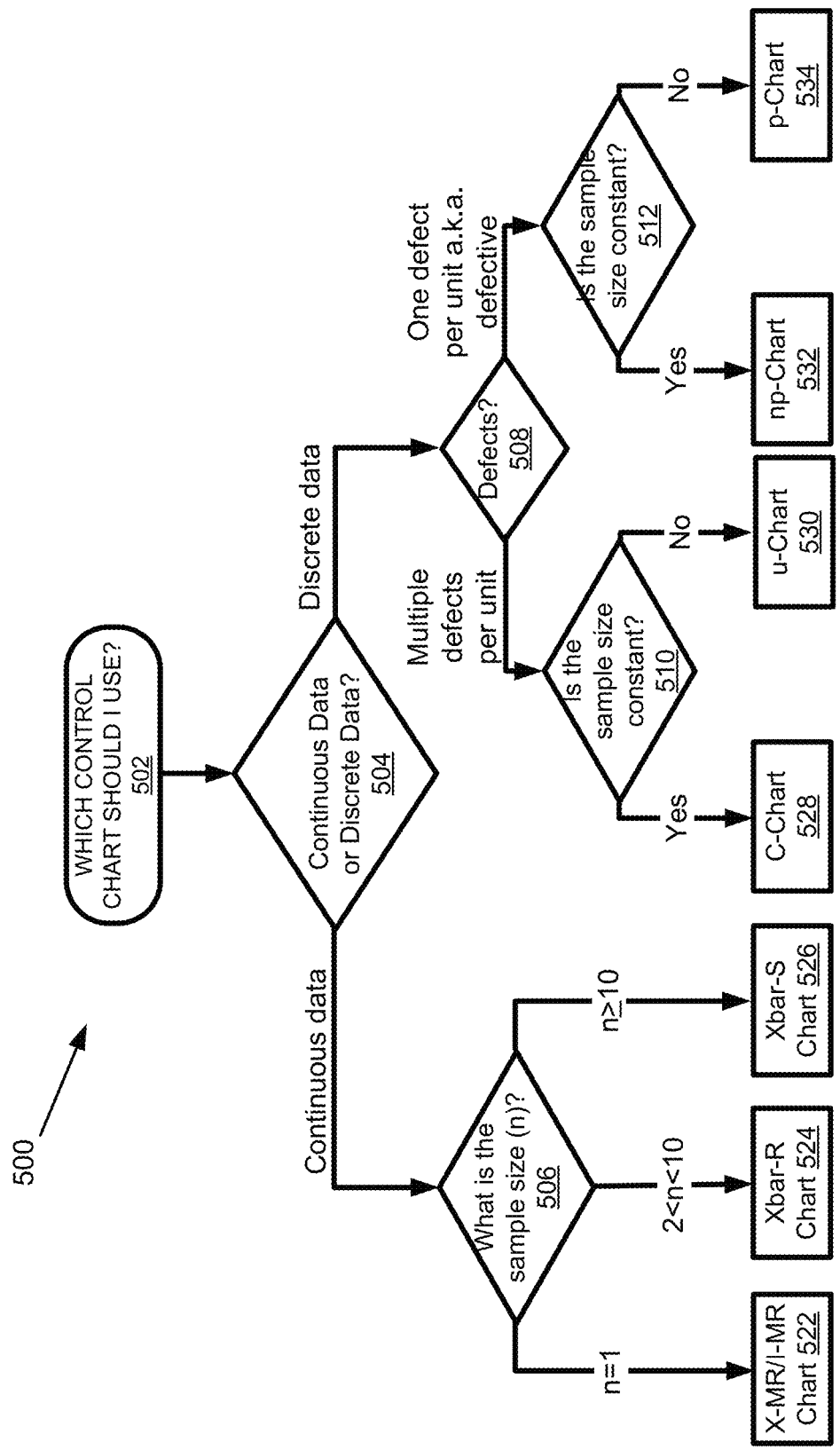
FIG. 5 is a flowchart of an example method for statistical process control.
Figure 6A:
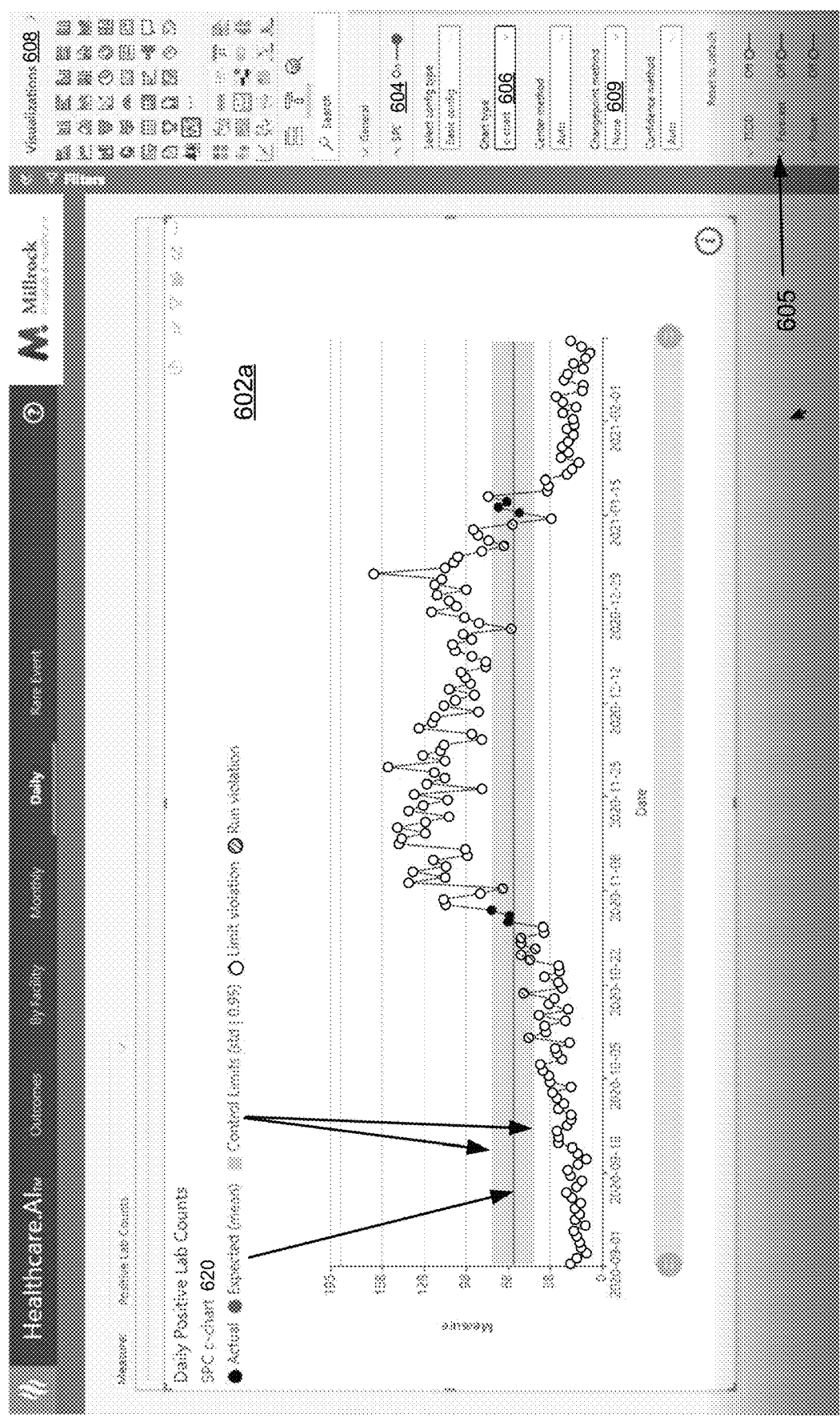
FIGS. 6a-c are illustrations of example user interfaces generated and presented according to some implementations.
Figure 6B:
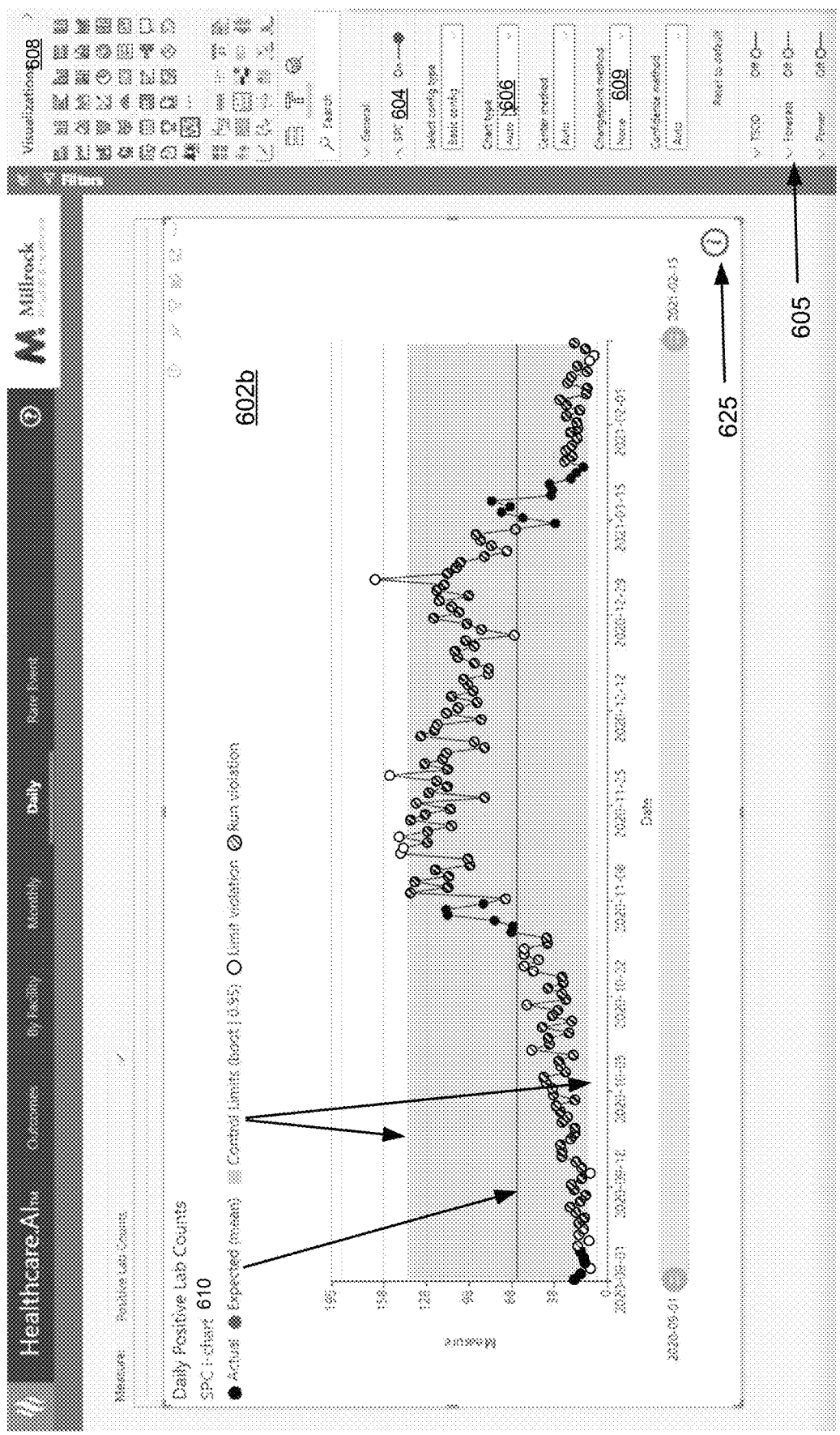
Figure 6C:
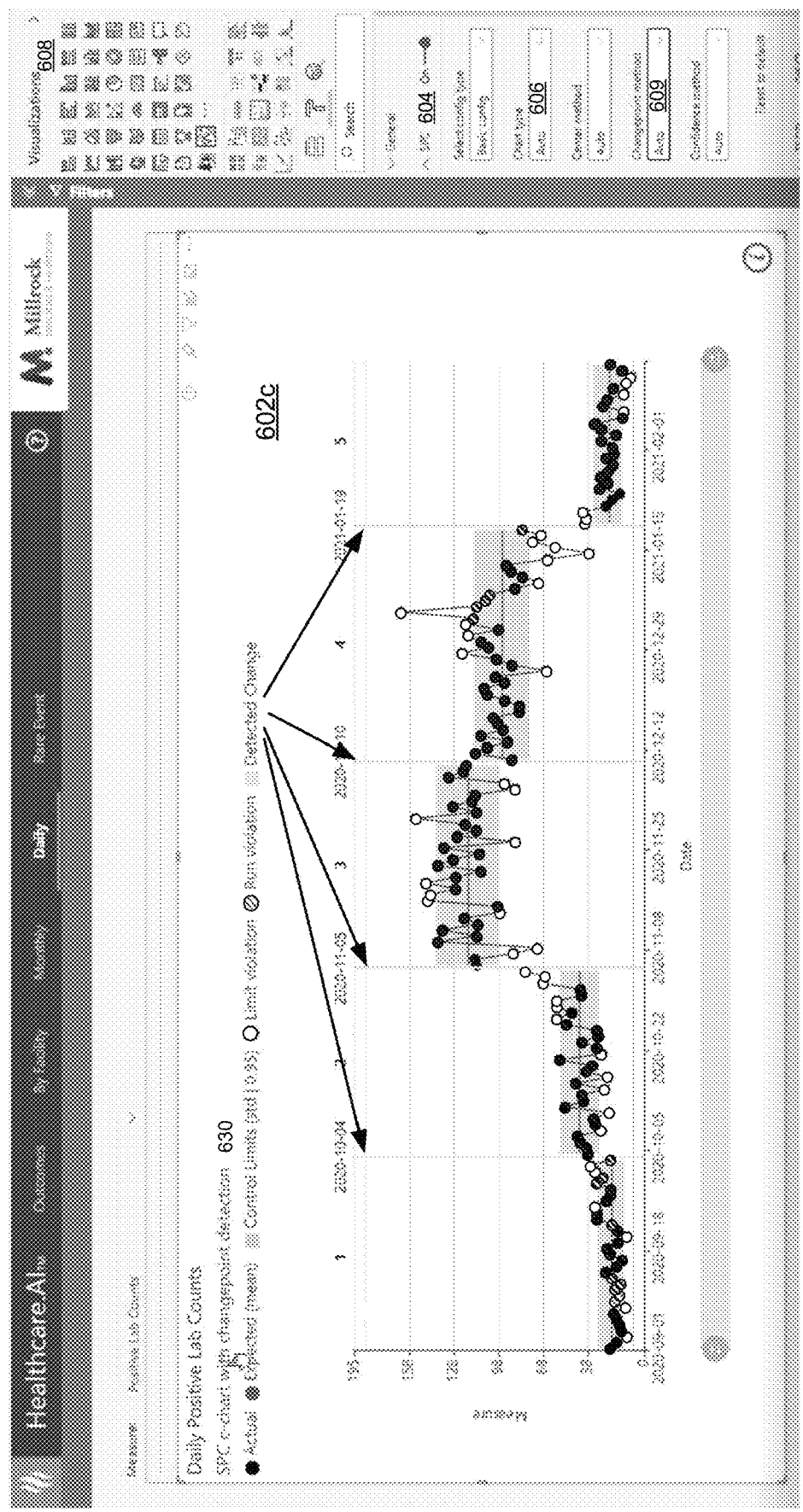

The third through fifth problems and the potential benefits discussed in association may be better be understood in reference to examples. Referring now to FIGS. 5-6c a human analyst uses a decision tree 500 similar to that shown in FIG. 5. When applying such a decision tree 500, to the discrete data underlying illustrated FIGS. 6a-c, the human analyst would conclude that a c-chart is the appropriate approach and resultant chart, as the data is discrete. The analyst would not use an i-chart, which appears on the bottom left corner at 522, under the "continuous data" branch in FIG. 5 and, thus, the i-chart is in contravention of the statistical process norms.

FIGS. 6a-6c illustrate examples of an improved user interface for displaying charts as well as selecting and manipulating the statistical approaches used in generating the charts. Referring now to FIG. 6a, the chart type 606 has been selected (e.g., overridden from "Auto") by the user to be a c-chart, and chart 602a is a c-chart, as indicated at 620, to illustrate what a "textbook" output from an analyst may look like when the decision tree from FIG. 5 is followed. From a statistical process control perspective for a decision maker, chart 602a provides little-to-no actionable insight as it indicates almost every point represents an exception or a problem. In some implementations, the analysis application 126 may generated the c-chart of 602a initially but evaluated the c-chart and rejected that output before applying a different approach. Depending on the implementation, the evaluation may be based on a threshold (e.g., a percentage or number of limit violations and/or run violations) or a statistical test to determine a likelihood that the output is useable.

Referring now to FIG. 6b, a user interface 600 based on the same time series data as FIG. 6a is illustrated according to one implementation. In FIG. 6b, the analysis application 126 is automatically determining the approach(es), as indicated by graphical element 604 indicating that SPC is "On", and the chart type is set to automatic as indicated by "Auto" at 606. As illustrated in FIG. 6b, the chart type determined by the analysis application 126 is an i-chart and uses a bootstrap confidence method (which is information presented when hovering over the "I" in the circle icon 625). When comparing FIGS. 6a to 6b, it should be recognized that, while approximately 10 points are coded as white (limit violations) in i-chart 602b, all but approximately 17 points in c-chart 602a are coded in white. While the number of white limit violations have been decreased from c-chart 602a, the number of run violations in i-chart 602b are increased, and this too may present a problem. Note that in FIGS. 6a and 6b, the changepoint method is set to "none" at 609.

Referring now to FIG. 6c, a user interface 600 based on the same time series data as FIGS. 6a and 6b is illustrated according to one implementation. In FIG. 6c, the changepoint method is set to "Auto" at 609, and the analysis application 126 has determined and output chart 602c, which is a c-chart with changepoint detection as indicated at 630. In the illustrated chart 602c, the changepoints are indicated by the vertical lines indicated in the plot. It should be recognized that the white background with black hashes coded (run violation) points and white coded (limit violation) points are fewer when compared to either chart 602a of FIG. 6a or chart 602b of FIG. 6b and chart 602c is more usable and actionable by a decision maker.

Figure 7:
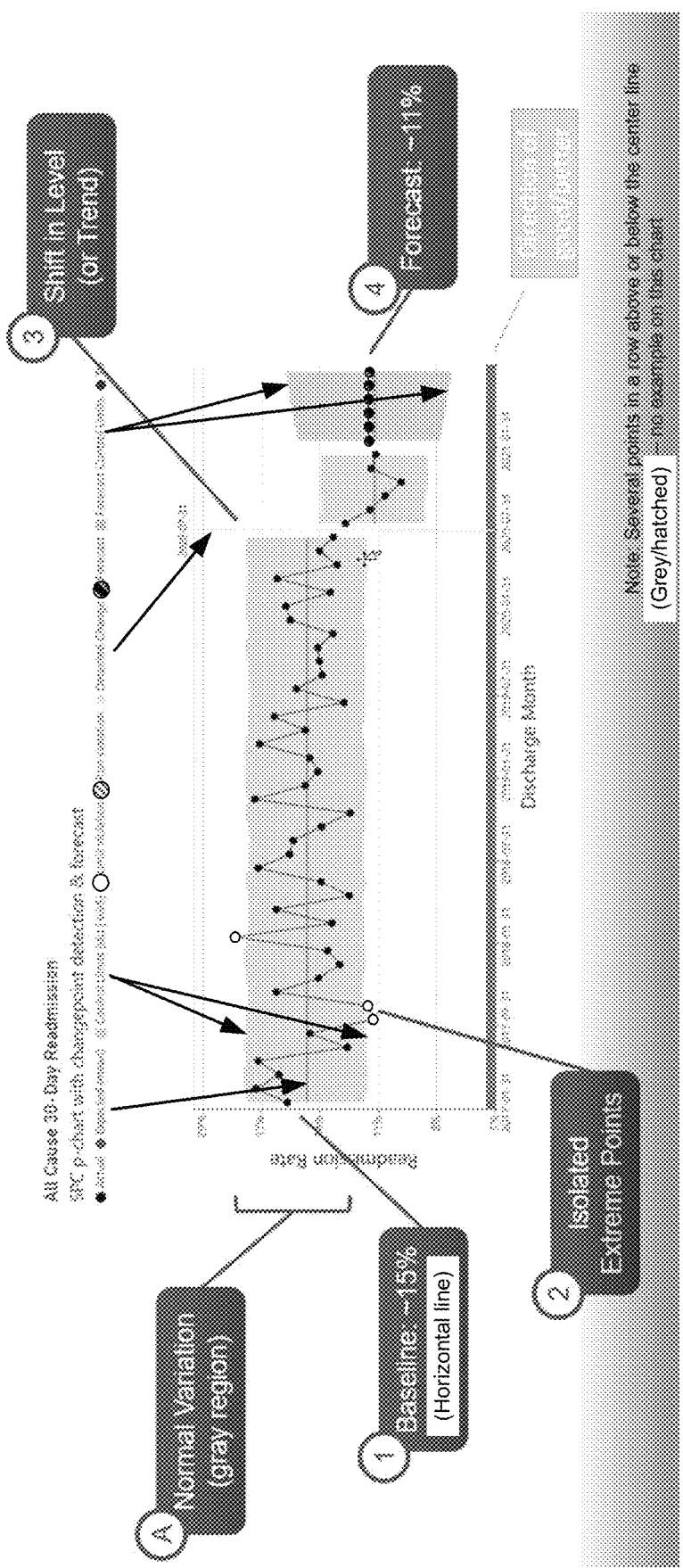
FIG. 7 illustrates an example user interface generated and presented according to some implementations.

Referring again to FIG. 6a, a user may select to add forecasting as indicated by graphical element 505, which illustrates a "Forecast" on/off toggle element. Similar to SPC 604, Forecast 605 may have options nested within (not shown), analogous to chart type 606 and changepoint method 609 nested under SPC 604. When the Forecast 605 option(s) are set to "Auto" the analysis application 126 may determine, apply, and output a forecast approach. For example, referring now to FIG. 7, a chart illustrating different time series data than that illustrated in FIGS. 6a-6c is shown. FIG. 7 illustrates a p-chart with changepoint detection and includes, as illustrated by the blue polygon at the right of the chart, a forecast. Additionally, FIG. 7 includes a color-coded graphical element along the x-axis, which is why the illustrated x-axis appears to be so thick. In some implementations, the color coded graphical element indicates a trend, e.g., green portions along the x-axis may be indicative of an improving/increasing/upward trend, red portions along the x-axis may be indicative of a downward trend, and yellow portions along the x-axis may be indicative of a neutral/flat trend. In some implementations, shade or intensity may be added to indicate degree. For example, light green may be slight upward trend and dark green a more significant upward trend. Note that the color coding along the x-axis in FIG. 7 is homogenous as the trend throughout, although it may not be readily apparent to the human eye, is consistently upward.

In some implementations, the analysis application 126, when determining the approach(es) to apply may factor in computation resources and determine a least costly approach likely to generate a useable output. For example, in one implementation, when set to "auto," the analysis application 126, upon determining that a c-chart (e.g., 602a) is unusable, the analysis application 126 determines that an i-chart (e.g., 602b) may be usable and is less computationally costly than a c-chart with changepoint detection (e.g., 602c), so the analysis application 126 generates and evaluates the i-chart (e.g. 602b), upon determining that the i-chart is also unusable based on the evaluation, the analysis application 126 applies changepoint detection and subsequently generates chart 602c.

While the above description of FIGS. 5-7 refers to examples of time series data, those examples are merely provided for clarity and convenience. Other data may be used in addition to, or instead of, time series data. For example, FIG. 8 illustrates a forest plot, which may be generated by the analysis application 126 and some features and functionalities according to some implementations.

It should further be recognized that FIG. 6a-6c are an improved user interface 600 for one or more of the following reasons. First, user interface 600 is platform agnostic, thereby allowing the user to generate, view, and manipulate the visualizations and charts consistently irrespective of the BI tool used. Second, the user interface 600 provides a comprehensive interface for various visualizations and charts, so a user need not find, download, and use different individual plugins, widgets, or add-ons to generate, e.g., an i-chart vs a p-chart. Third, the user interface 600 provides transparent and granular control (e.g., selective activation, deactivation, or manipulation) of various statistical process control and forecasting options and sub-options (e.g., via dedicated graphical elements in a menu or sidebar, such as 604, 605, 606, 609, and others, within the user interface 600), so that the user may control the degree of automation and the output as desired.

Example Methods

Figure 9:
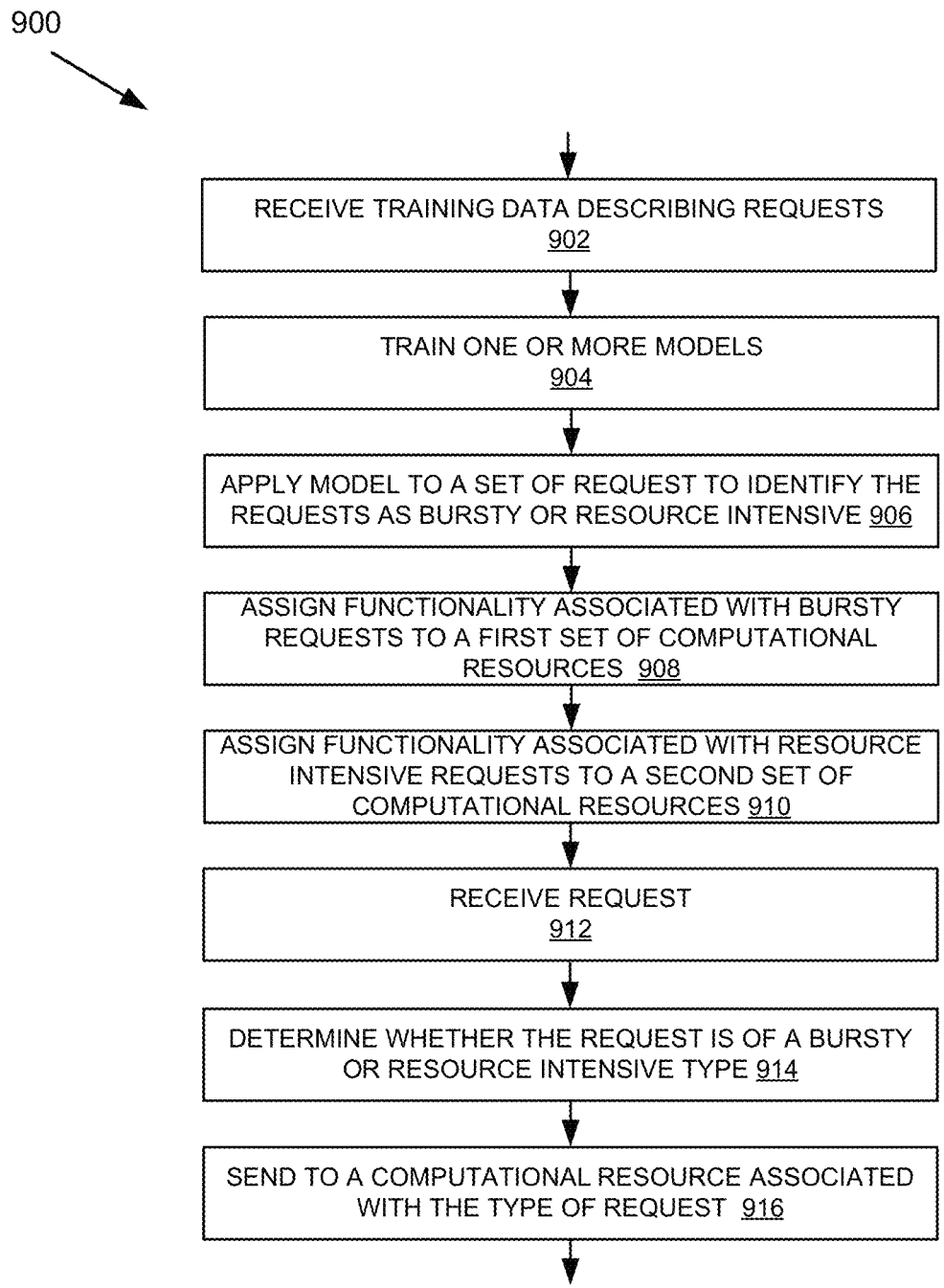
FIG. 9 is flowchart of an example method for assigning a request to a request-type specific computational resource in accordance with some implementations.
Figure 10:
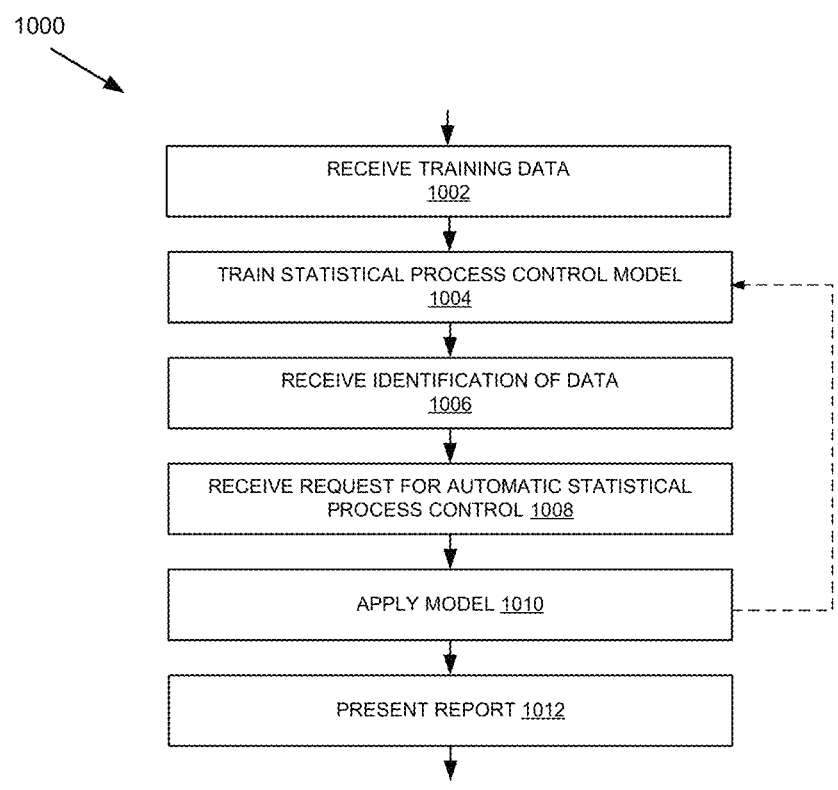
FIG. 10 is a flowchart of an example method for generating a report in accordance with some implementations.

FIGS. 9 and 10 are flowcharts of example methods that may, in accordance with some implementations, be performed by the systems described above with reference to FIGS. 1-4. The methods 900 and 1000 of FIGS. 9 and 10 are provided for illustrative purposes, and it should be understood that many variations exist and are within the scope of the disclosure herein.

FIG. 9 is flowchart of an example method 900 for assigning a request-type specific computational resource in accordance with some implementations. The method 900 begins at block 902. At block 902, the request receiver 322 receives training data describing requests. At block 904, the request assignment engine 324 trains one or more models. At block 906, the request assignment engine 324 applies at least one model to a set of requests to identify the requests in the set as bursty or resource intensive. At block 908, the request manager 224 assigns functionality associated with one or more bursty requests to a first set of computational resources and, at block 910, assigns functionality associated with one or more resource intensive requests to a second set of computational resources. For example, a first set of computational resources is assigned a first core size and a second set of computational resources is assigned a second core size. At block 912, the request receiver 322 receives a request. At block 914, the request assignment engine 324 determines whether the request received at block 912 is a bursty or resource intensive type of request. At block 916, the request router 326 sends the request received at block 912 to a computational resource associated with the type associated with the request, as determined at block 914. For example, when the request is determined to be bursty at block 914, the request router 326 sends, at block 916, the request to a computational resource in the first set of computational resources, and when the request is determined to be resource intensive at block 914, the request router 326 sends, at block 916, the request to a computational resource in the second set of computational resources.

FIG. 10 is flowchart of an example method 1000 for generating a report in accordance with some implementations. The method 1000 begins at block 1002. At block 1002, the data receiver 332 receives training data. At block 1004, the auto-approach determiner 334 trains a statistical process control model. At block, 1006, the data receiver 332 receives an identification of data, e.g., a set of data to be used in generating a chart and/or report. At block 1008, the auto-approach determiner 334 receives a request for automatic statistical process control. At block 1010, one or more of the approach applicators A-N 336a-336n applies the statistical process control model generated at block 1004 to the data identified at block 1006, thereby generating a report. At block 1012, the report generator 226 presents the report.

OTHER CONSIDERATIONS

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It should be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, applications, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
receiving, using a request assignment engine, a request to generate a report based on an identified data set;
determining, by the request assignment engine using a machine learning model, a request type associated with the request to generate the report,
wherein, responsive to the machine learning model determining that the request to generate the report is a bursty type request, one or more processors of a first specialized computational resource associated with burst type requests are assigned, and
wherein, responsive to the machine learning model determining that the request to generate the report is a resource intensive type, one or more processors of a second specialized computational resource associated with resource intensive type requests are assigned;
sending, using a request router, the request to generate the report to the assigned, specialized computational resource based on the determined request type;
determining, using the one or more processors of the assigned, specialized computational resource, a first statistical approach to apply to the identified data set automatically;
applying, using the one or more processors of the assigned, specialized computational resource, the first statistical approach to the identified data;
generating, using the one or more processors of the assigned, specialized computational resource, the report including one or more charts based on at least one statistical approach; and
presenting, using the one or more processors of the assigned, specialized computational resource, the report.

2. The computer-implemented method of claim 1, wherein the first statistical approach to apply to the identified data set is automatically determined by applying a second machine learning model.

3. The computer-implemented method of claim 1, wherein the one or more charts include at least one of an X-MR chart, an I-MR char, an Xbar-R chart, an Xbar-S chart, C-chart, a u-chart, an np chart, a p-chart, a s-chart, an r-chart, an mr-chart, and a forest plot.

4. The computer-implemented method of claim 1 further including:
determining whether the first statistical approach results in a suitable chart; and
responsive to the first statistical approach resulting in a suitable chart, including the suitable chart in the report; or
responsive to the first statistical approach resulting in an unsuitable chart, applying a second statistical approach.

5. The computer-implemented method of claim 4, wherein one or more of the first statistical approach and the second statistical approach is in contravention of statistical process norms.

6. The computer-implemented method of claim 4, wherein one or more of the first statistical approach and the second statistical approach is in contravention of statistical process norms but is determined to yield a suitable result, wherein suitability is based on one or more of a number and a proportion of outliers identified.

7. The computer-implemented method of claim 1, wherein determining the first statistical approach to apply to the identified data set automatically is responsive to selection of a first graphical element, the method further including:
presenting a user interface to a user on a display, wherein the user interface includes:
the first graphical element that allows a user to selectively activate and deactivate the automatic determination of the first statistical approach;
a second graphical element that determines, based on user input selecting from a plurality of available chart types, a chart type and at least partially overrides the automatic determination of the first statistical approach;
a third graphical element that determines, based on user input, a change point method and at least partially overrides the automatic determination of the first statistical approach;
a fourth graphical element that determines, based on user input, a confidence method and at least partially overrides the automatic determination of the first statistical approach;
a fifth graphical element that determines, based on user input, whether a forecast is presented and at least partially overrides the automatic determination of the first statistical approach; and
a plurality of graphical elements associated with a plurality of user selectable visualizations for user-selectable inclusion in the report.

8. The computer-implemented method of claim 1, wherein the first specialized computational resource and the second specialized computational resource are specialized based at least in part on a difference in one or more of scaling rules, processing core size, and memory core size.

9. The computer-implemented method of claim 1, wherein the machine learning model is trained using historical request data including response time.

10. A system comprising:
a processor; and
a memory, the memory storing instructions that, when executed by the processor, cause the system to:
receive, by a request assignment engine, a request to generate a report based on an identified data set;
determine, by the request assignment engine using a machine learning model, a request type associated with the request to generate the report
wherein, responsive to the machine learning model determining that the request to generate the report is a bursty type request, one or more processors of a first specialized computational resource associated with burst type requests are assigned, and
wherein, responsive to the machine learning model determining that the request to generate the report is a resource intensive type, one or more processors of a second specialized computational resource associated with resource intensive type requests are assigned;
send, using a request router, the request to generate the report to the assigned, specialized computational resource based on the determined request type;
determine, using one or more processors of the assigned, specialized computational resource, a first statistical approach to apply to the identified data set automatically;
apply, using the one or more processors of the assigned, specialized computational resource, the first statistical approach to the identified data;

generate, using the one or more processors of the assigned, specialized computational resource, the report including one or more charts based on at least one statistical approach; and present, using the one or more processors of the assigned, specialized computational resource, the report.

11. The system of claim 10, wherein the first statistical approach to apply to the identified data set is automatically determined by applying a second machine learning model.

12. The system of claim 10, wherein the one or more charts include at least one of an X-MR chart, an I-MR char, an Xbar-R chart, an Xbar-S chart, C-chart, a u-chart, an np chart, a p-chart, a s-chart, an r-chart, an mr-chart, and a forest plot.

13. The system of claim 10, wherein the memory further stores instructions that, when executed by the processor, cause the system to:

determine whether the first statistical approach results in a suitable chart; and responsive to the first statistical approach resulting in a suitable chart, include the suitable chart in the report; or responsive to the first statistical approach resulting in an unsuitable chart, apply a second statistical approach.

14. The system of claim 13, wherein one or more of the first statistical approach and the second statistical approach is in contravention of statistical process norms.

15. The system of claim 13, wherein one or more of the first statistical approach and the second statistical approach is in contravention of statistical process norms but is determined to yield a suitable result, wherein suitability is based on one or more of a number and a proportion of outliers identified.

16. The system of claim 10, wherein determining the first statistical approach to apply to the identified data set automatically is responsive to selection of a first graphical element, wherein the memory further stores instructions that, when executed by the processor, cause the system to:

present a user interface to a user on a display, wherein the user interface includes:

the first graphical element that allows a user to selectively activate and deactivate the automatic determination of the first statistical approach;

a second graphical element that determines, based on user input selecting from a plurality of available chart types, a chart type and at least partially overrides the automatic determination of the first statistical approach;

a third graphical element that determines, based on user input, a change point method and at least partially overrides the automatic determination of the first statistical approach;

a fourth graphical element that determines, based on user input, a confidence method and at least partially overrides the automatic determination of the first statistical approach;

a fifth graphical element that determines, based on user input, whether a forecast is presented and at least partially overrides the automatic determination of the first statistical approach; and a plurality of graphical elements associated with a plurality of user selectable visualizations for user-selectable inclusion in the report.

17. The system of claim 10, wherein the first, specialized computational resource and the second, specialized computational resource are specialized based at least in part on a difference in one or more of scaling rules, processing core size, and memory core size.

18. The system of claim 10, wherein the machine learning model is trained using historical request data including response time.

* * * * *